United States Patent
Sakuma

(10) Patent No.: US 6,212,371 B1
(45) Date of Patent: Apr. 3, 2001

(54) MOBILE WIRELESS TERMINAL AND POWER CONTROLLING METHOD

(75) Inventor: Shigeru Sakuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/251,579

(22) Filed: Feb. 17, 1999

(30) Foreign Application Priority Data

Feb. 20, 1998 (JP) .................................................. 10-038865

(51) Int. Cl.[7] .............................. H04B 1/16; H04B 1/38; H03H 7/40; H04L 23/00
(52) U.S. Cl. ........................ 455/343; 455/38.3; 455/574; 375/229; 375/377; 375/368
(58) Field of Search .................... 455/38.3, 343, 455/502, 574; 375/229, 377, 368; 713/320

(56) References Cited

U.S. PATENT DOCUMENTS

| | | |
|---|---|---|
| 5,212,803 | 5/1993 | Uddenfeldt et al. . |
| 5,363,411 | 11/1994 | Furuya et al. . |
| 5,648,986 * | 7/1997 | Tatsumi et al. .................... 375/229 |
| 5,815,533 * | 9/1998 | Mourot ................................ 375/316 |
| 5,903,601 * | 5/1999 | Elnashar et al. ..................... 375/220 |
| 5,956,371 * | 9/1999 | Yamane ............................... 375/232 |
| 6,088,409 * | 7/2000 | Naruse ................................ 375/354 |

FOREIGN PATENT DOCUMENTS

| | | |
|---|---|---|
| 01252033 * | 10/1989 | (JP) . |
| 1-252033 | 10/1989 | (JP) . |
| 2-82731 | 3/1990 | (JP) . |
| 02082731 * | 3/1990 | (JP) . |
| 5-207076 | 8/1993 | (JP) . |

OTHER PUBLICATIONS

European Search Report issued Oct. 27, 1999 in a related application.

* cited by examiner

Primary Examiner—Lee Nguyen
Assistant Examiner—Sheila Smith
(74) Attorney, Agent, or Firm—Ostrolenk, Faber, Gerb & Soffen, LLP

(57) ABSTRACT

A mobile wireless terminal comprises an RF receiving means for receiving a transmission radio wave received from a base station on a designated channel, a waveform equalizer for equalizing waveform distortion of a signal received by said RF receiving means, a unique word detector for detecting a unique word from a reception signal sequence whose waveform distortion has been equalized by said waveform equalizer, a channel switching controlling means for switching the current reception channel of said RF receiving means to another reception channel corresponding to a channel switch request, a carrier detector for detecting whether or not a transmission radio wave has been received by said RF receiving means and supplying a channel switch request to said channel switching controlling means when the transmission radio wave has not been received for a predetermined time period, and a sliding controlling means for performing an on/off control for the power of said waveform equalizer at predetermined intervals for a predetermined time period when a transmission radio wave has been detected by said carrier detector.

12 Claims, 8 Drawing Sheets

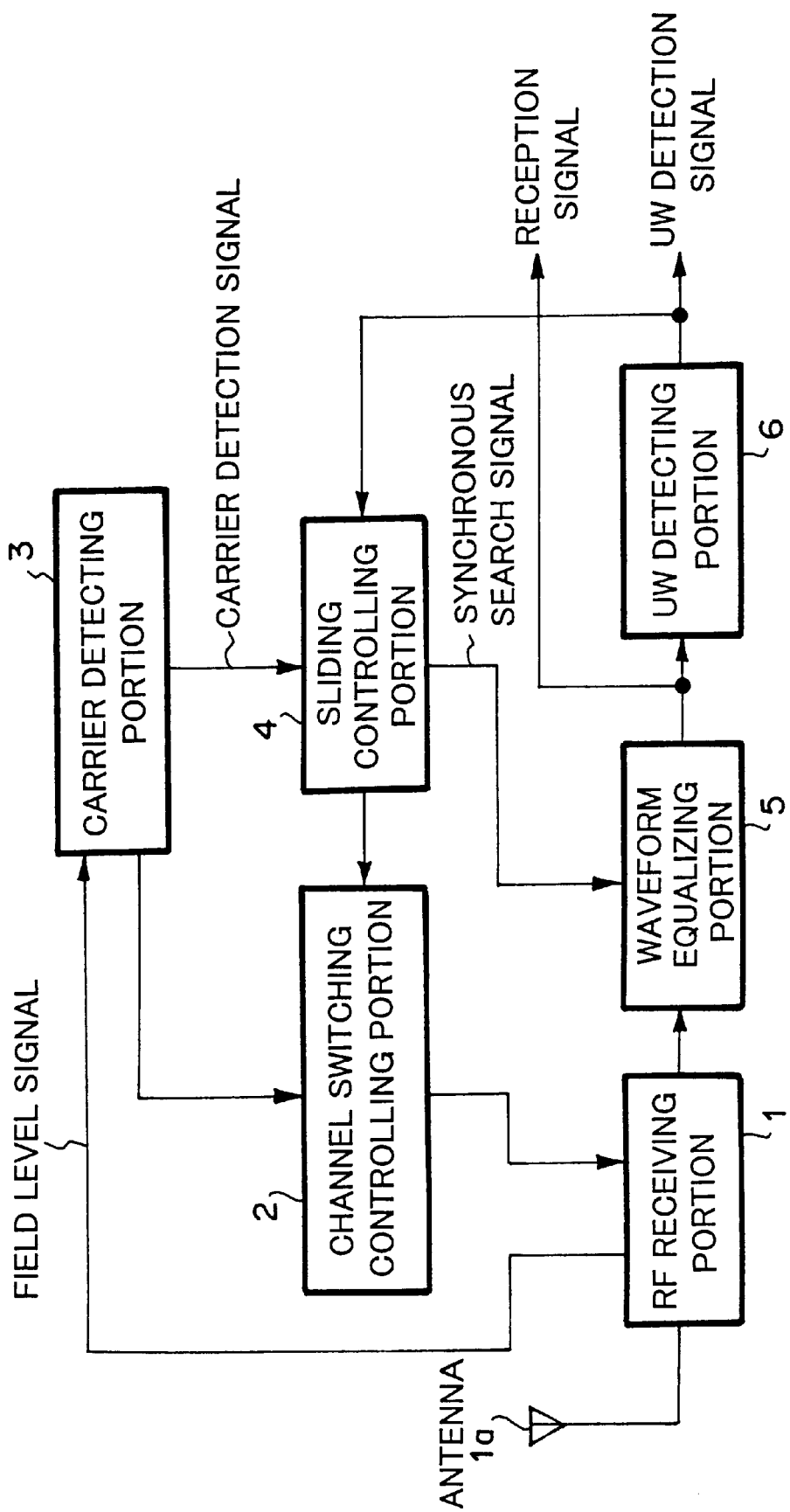

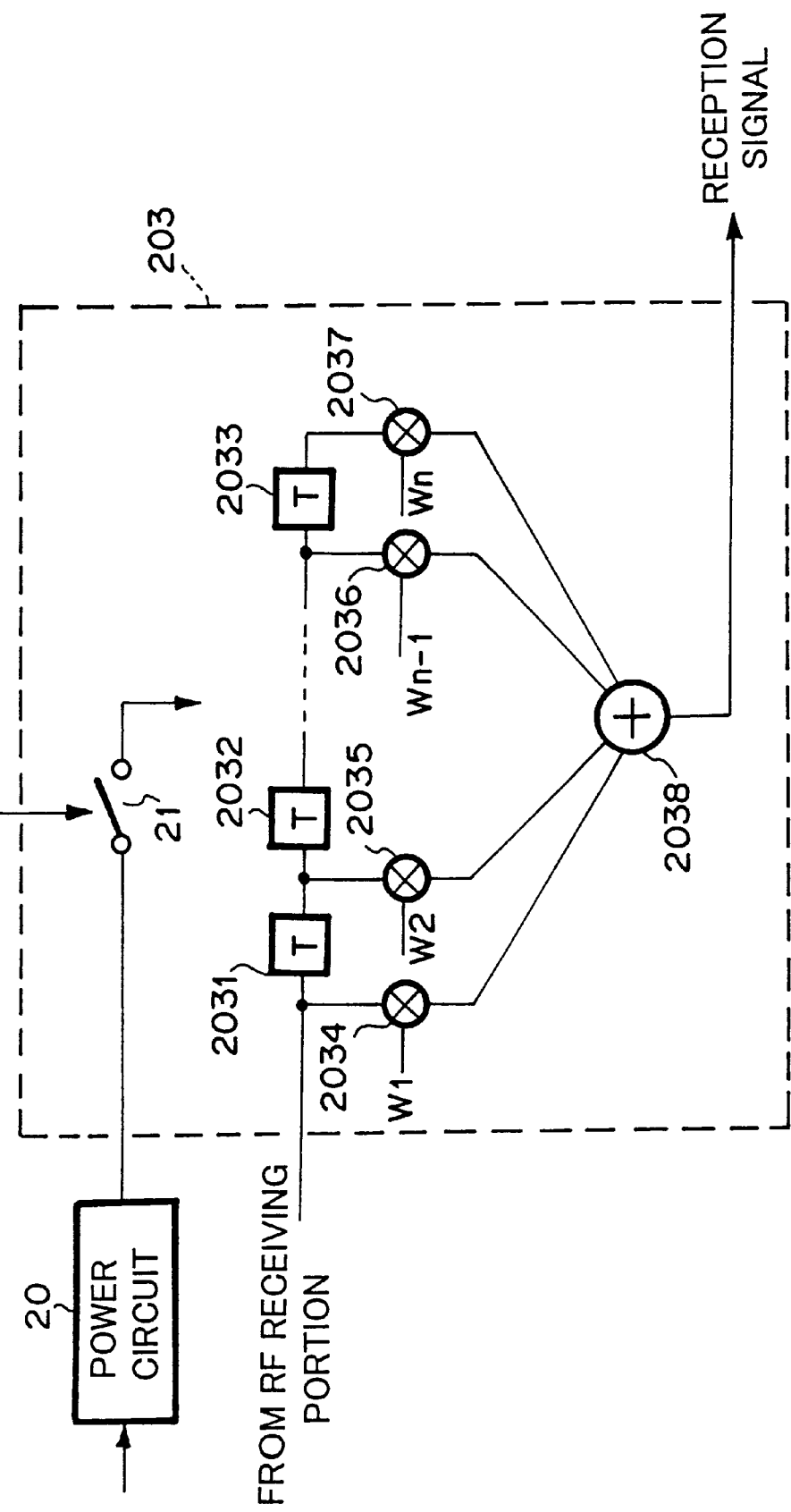

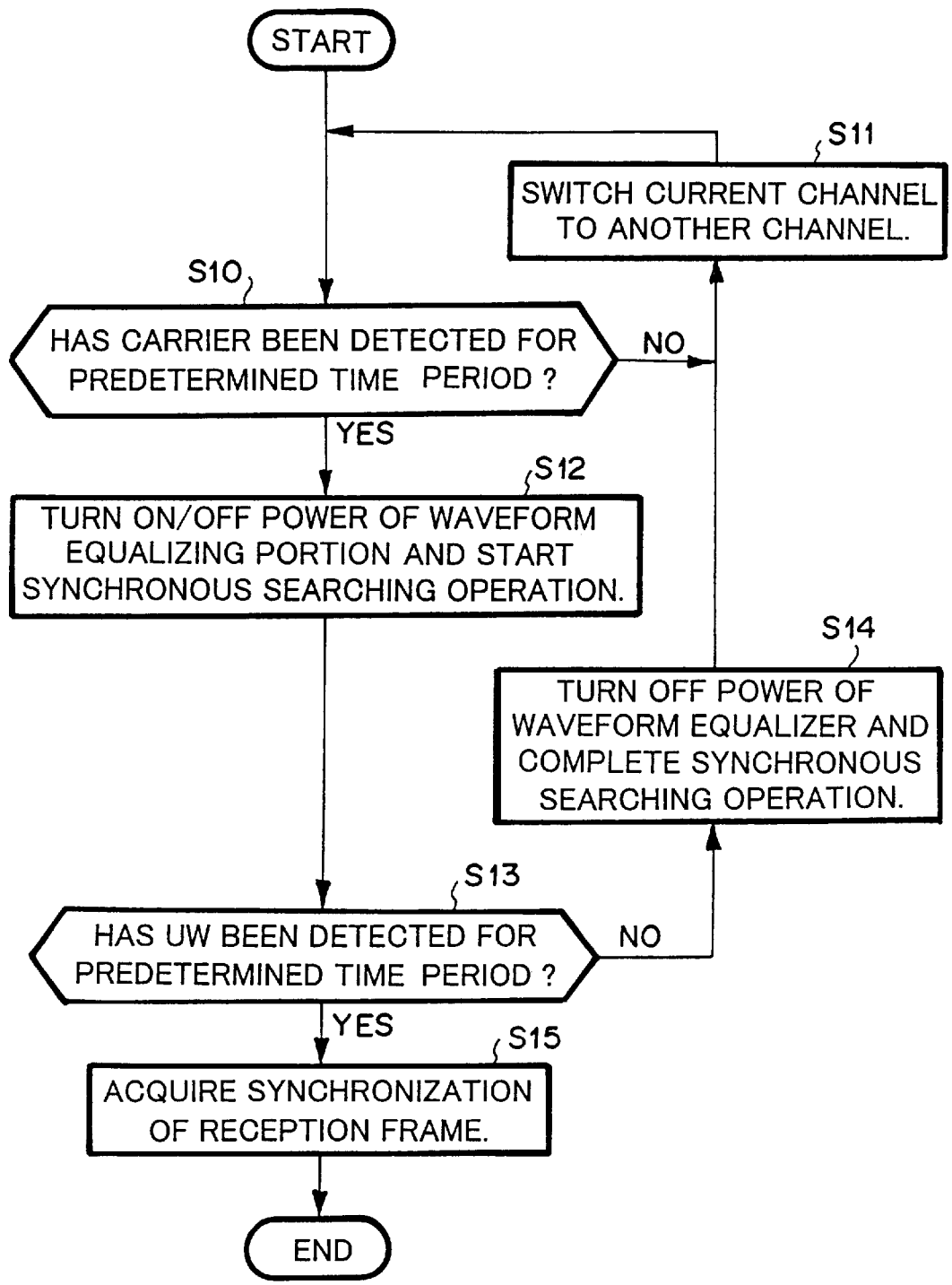

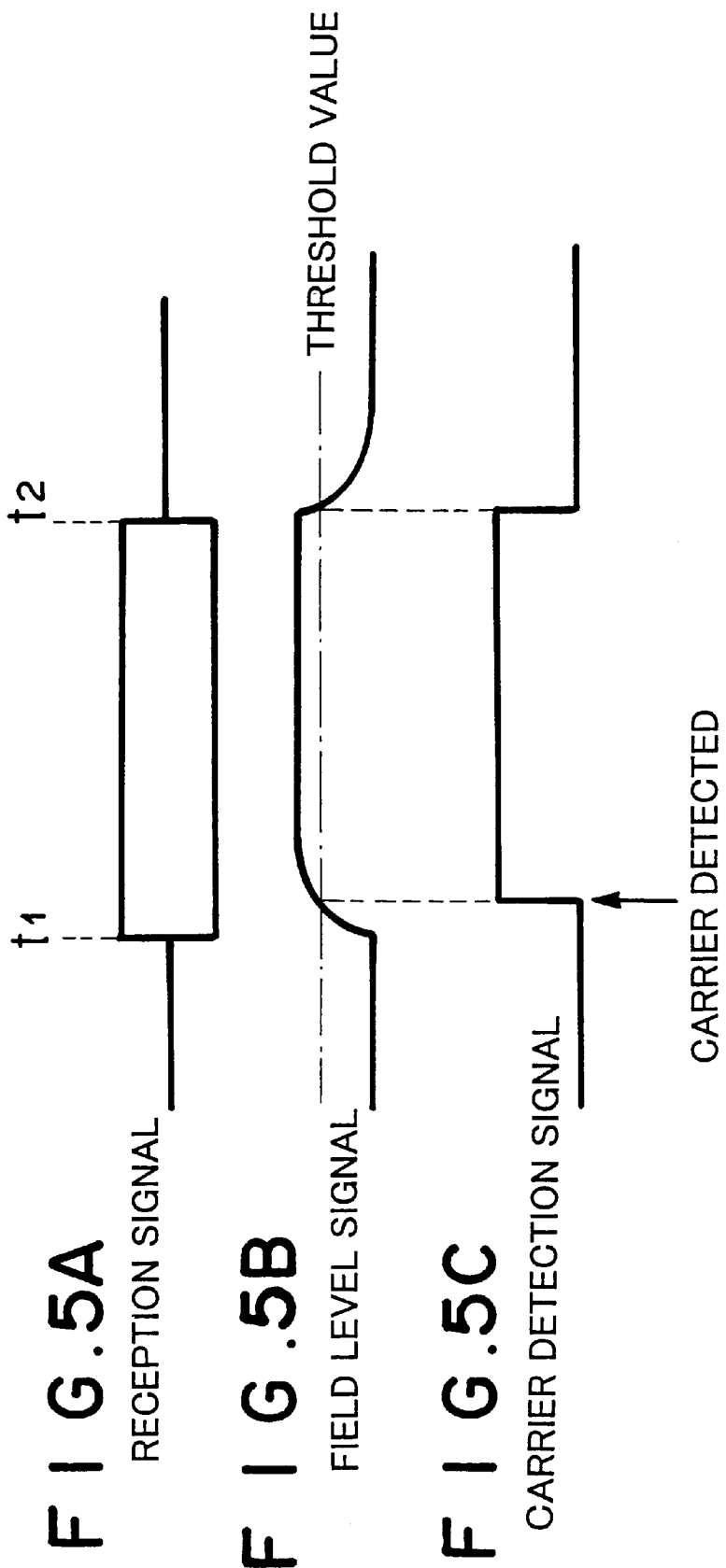

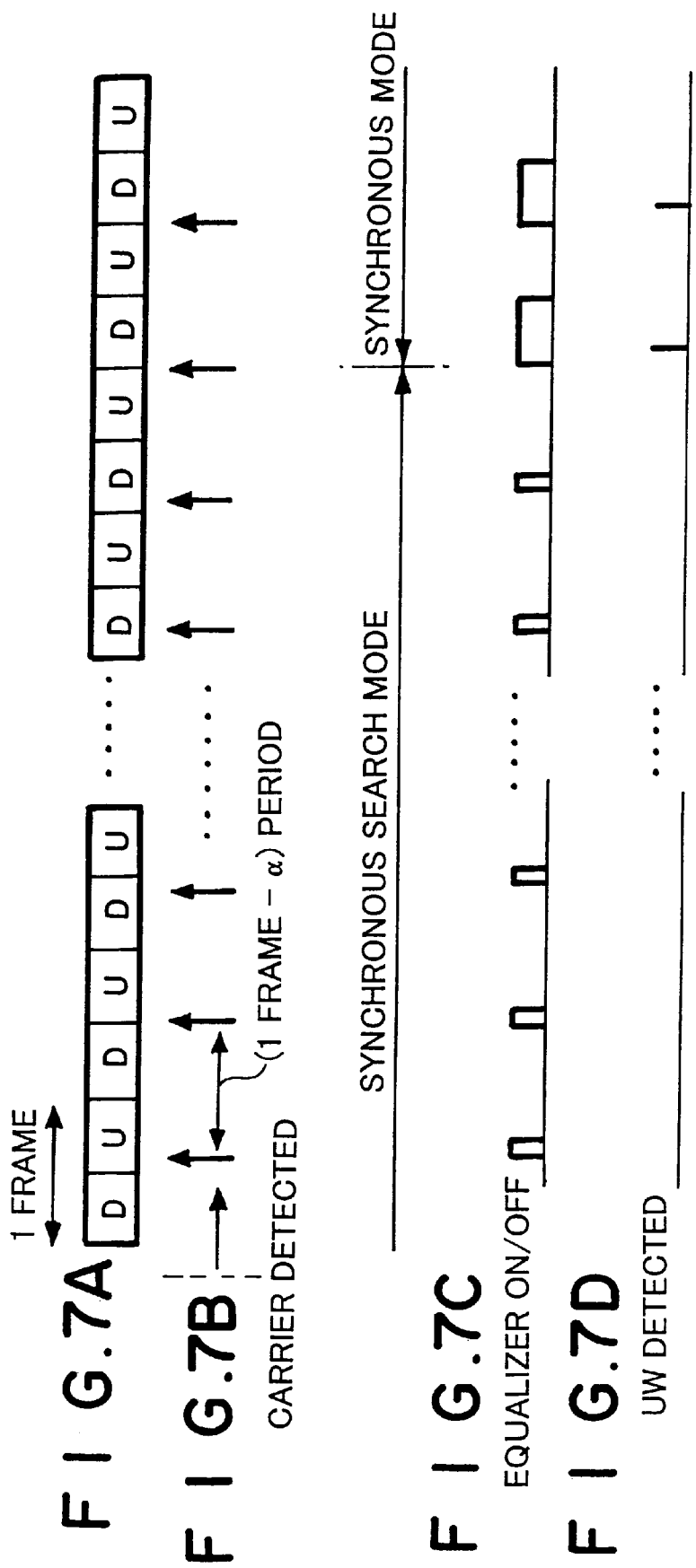

MOBILE WIRELESS TERMINAL AND POWER CONTROLLING METHOD

BACKGROUND OF THE INVENTION

1. Field of the Invention

The present invention relates to a mobile wireless terminal such as a portable telephone unit or the like, in particular, to a mobile wireless terminal such as a portable telephone unit having an adaptive equalizer such as a waveform equalizer. The present invention also relates to a power controlling method for such a mobile wireless terminal.

2. Description of the Related Art

Since a mobile wireless terminal is driven with a battery, one of essential performances thereof is low power consumption. In particular, while the user travels with a mobile wireless terminal, the power thereof is usually turned on. Thus, when the mobile wireless terminal is in standby state or in out-of-service-area state, it is important to reduce the power consumption to prolong the operation time of the terminal. In addition, as the transmission rate becomes high, an adaptive equalizer that consumes large power is used in the mobile wireless terminal along with the conventional demodulator. In the mobile radio terminal using such a structure, the power control of the adaptive equalizer is important.

FIG. 1 is a block diagram showing the outlined structure of a mobile wireless terminal that performs the power control of the adaptive equalizer. The mobile wireless terminal detects a transmission radio wave (carrier) received from a base station. Only when the mobile wireless terminal has received the transmission radio wave, it causes the adaptive equalizer to operate. The mobile wireless terminal comprises an RF receiving portion 1, a channel switching controlling portion 2, a carrier detecting portion 3, a waveform equalizing portion 5, and a unique word (UW) detecting portion 6 as principal portions.

A radio wave transmitted from a base station is received by an antenna 1a. An RF signal received from the antenna 1a is supplied to an RF receiving portion 1. The RF receiving portion 1 receives the RF signal on a designated channel (at a designated reception frequency), converts the reception signal into a digital signal, and supplies the digital signal to the waveform equalizing portion 5. In addition, the RF receiving portion 1 supplies a signal that represents the level of the electric field of the received transmission radio wave to the carrier detecting portion 3. The field level signal is obtained by converting an output signal of a log amplifier of the RF receiving portion 1 into a digital signal.

The carrier detecting portion 3 compares the input field level signal with a predetermined threshold value. When the field level exceeds the threshold value, the carrier detecting portion 3 supplies a carrier detection signal to the waveform equalizing portion 5. When the carrier detecting portion 3 has not received a carrier for a predetermined time period, the carrier detecting portion 3 supplies a channel switch request signal to the channel switching controlling portion 2 so as to switch the reception channel of the RF receiving portion 1 into another reception channel.

When the channel switching controlling portion 2 receives the channel switch request signal from the carrier detecting portion 3, the channel switching controlling portion 2 switches the current channel (reception frequency) of the RF receiving portion 1 to another reception channel. This switching operation is performed by varying the frequency of a synthesizer of the RF receiving portion 1 (the synthesizer converts a frequency between a transmission/reception frequency and an intermediate frequency).

The waveform equalizing portion 5 equalizes a waveform distortion of the digital signal received from the RF receiving portion 1. Only when the carrier detection signal is received from the carrier detecting portion 3, the power of the waveform equalizing portion 5 is turned on. An output signal of the waveform equalizing portion 5 is input to a demodulator (not shown) and the UW detecting portion 6.

The UW detecting portion 6 detects a UW from a reception signal sequence that is output from the RF receiving portion 1 through the waveform equalizing portion 5. Corresponding to the UW detected by the UW detecting portion 6, a reference timing of a reception frame (for example, TDMA frame) is extracted. Corresponding to the frame reference timing, the synchronization of the reception frame is acquired.

In the above-described mobile wireless terminal, only when a carrier is detected, the power of the adaptive waveform equalizing portion 5 is turned on. Thus, in the standby state and in the out-of-service-area, the power consumption of the mobile wireless terminal is reduced.

As another related art reference disclosed in for example Japanese Patent Laid-Open Publication No. 2-82731, a waveform equalizing portion is composed of a first block and a second block. The power of the first block is always turned on. In contrast, the power of the second block is turned on only when a carrier is detected.

However, the mobile wireless terminal shown in FIG. 1 has the following problems.

When the radio reception state is bad and thereby the carrier/noise ratio (C/N ratio: ratio of power of carrier and noise) is bad, a carrier is frequently received without a received burst. When a mobile wireless terminal 11 of TDMA/TDD system is in out-of-service-area state as shown in FIG. 2, the mobile wireless terminal 11 cannot receive a down burst. In this case, the mobile wireless terminal 11 frequently detects a carrier corresponding to up bursts of other mobile wireless terminals 12 and 13. Thus, the mobile wireless terminal 11 frequently detects a carrier corresponding to signals received from other than the base station, the waveform equalizing portion unnecessarily operates and thereby remarkably consumes the power of the battery.

In addition, the mobile wireless terminal cannot determine whether a received carrier is a signal received from a relevant base station, and whether a signal is received from another terminal, or noise. Thus, the mobile wireless terminal cannot determine a channel switch timing when should be switched to another carrier channel. Consequently, the waiting time on the same channel unnecessarily becomes long.

In Japanese Patent Laid-Open Publication No. 1-252033, another method is disclosed. In the method, a control signal is acquired in the condition that the current reception channel is not varied for a predetermined time period. After it is determined whether a control signal has been received in out-of-service-area state or has temporarily deteriorated, the control signal or another control signal is acquired corresponding to the determined result. However, a practical means for applying such a method to the power control of the waveform equalizer has not been accomplished.

SUMMARY OF THE INVENTION

An object of the present invention is to provide a mobile wireless terminal and a power controlling method that allow the power consumption in standby state and in out-of-service-area state to be remarkably reduced.

A first aspect of the present invention is a mobile wireless terminal, comprising an RF receiving means for receiving a transmission radio wave received from a base station on a designated channel, a waveform equalizing means for equalizing waveform distortion of a signal received by said RF receiving means, a unique word detecting means for detecting a unique word from a reception signal sequence whose waveform distortion has been equalized by said waveform equalizing means, a channel switching controlling means for switching the current reception channel of said RF receiving means to another reception channel corresponding to a channel switch request, a carrier detecting means for detecting whether or not a transmission radio wave has been received by said RF receiving means and supplying a channel switch request to said channel switching controlling means when the transmission radio wave has not been received for a predetermined time period, and a sliding controlling means for performing an on/off control for the power of said waveform equalizing means at predetermined intervals for a predetermined time period when a transmission radio wave has been detected by said carrier detecting means, for turning off the power of said waveform equalizing means and supplying a channel switch request to said channel switching controlling means if a unique word has not been detected by said unique word detecting means when the on/off control had been performed, and for performing the on/off control for the power of said waveform equalizing means in synchronization with a frame period of the reception signal sequence corresponding to a detection timing of the unique word when the unique word has been detected.

A second aspect of the present invention is a power controlling method for use with a mobile wireless terminal having waveform equalizing means for equalizing waveform distortion of a reception signal, comprising the steps of (a) determining whether or not a transmission radio wave has been received for a predetermined time period, (b) when the transmission radio wave has not been received, switching the current reception channel to another reception channel and receiving the transmission radio wave, (c) when the transmission radio wave has been received, performing on/off control for the power of the waveform equalizing means at predetermined intervals for a predetermined time period, (d) when the on/off control for the power of the waveform equalizing means had been performed, if a unique word has not been detected from a reception signal sequence that is output from the waveform equalizing means, turning off the power of the waveform equalizing means, switching the current reception channel to another reception channel, and receiving the transmission radio wave, (e) when a unique word has been detected, performing the on/off control for the power of the waveform equalizing means in synchronization with a frame period of the reception signal sequence at a unique word detection timing.

As described above, according to the present invention, only when a carrier is detected, the power of the waveform equalizing portion is intermittently turned on/off at predetermined intervals for a predetermined time period. While the power is being turned on/off, if a UW is not detected, the current reception channel is switched to another channel. Thus, even if a signal transmitted from other than a base station is received as a carrier, since a UW is not detected, the current reception channel is switched to another channel. Consequently, the mobile wireless terminal can be prevented from wastefully waiting for a carrier on the same channel.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3A is a block diagram showing the structure of a mobile wireless terminal according to an embodiment of the present invention;

FIG. 3B is a block diagram showing the structure of a waveform equalizing portion of the mobile wireless terminal shown in FIG. 3A;

FIG. 4 is a flow chart for explaining the operation of the mobile wireless terminal shown in FIG. 3A;

FIG. 5 is a time chart for explaining a carrier detecting operation;

FIGS. 7A, 7B, 7C, and 7D are schematic diagrams for explaining a power controlling operation of a sliding controlling portion shown in FIG. 3A:

FIG. 7A is a schematic diagram showing a TDMA/TDD frame that composes a reception signal sequence;

FIG. 7B is a schematic diagram showing a synchronous searching operation in the case that a carrier is detected;

FIG. 7C is a schematic diagram showing a power on/off operation of the waveform equalizing portion; and FIG. 7D is a schematic diagram showing an UW detecting operation.

DESCRIPTION OF PREFERRED EMBODIMENTS

Next, with reference to the accompanying drawings, an embodiment of the present invention will be described.

Figure 1:
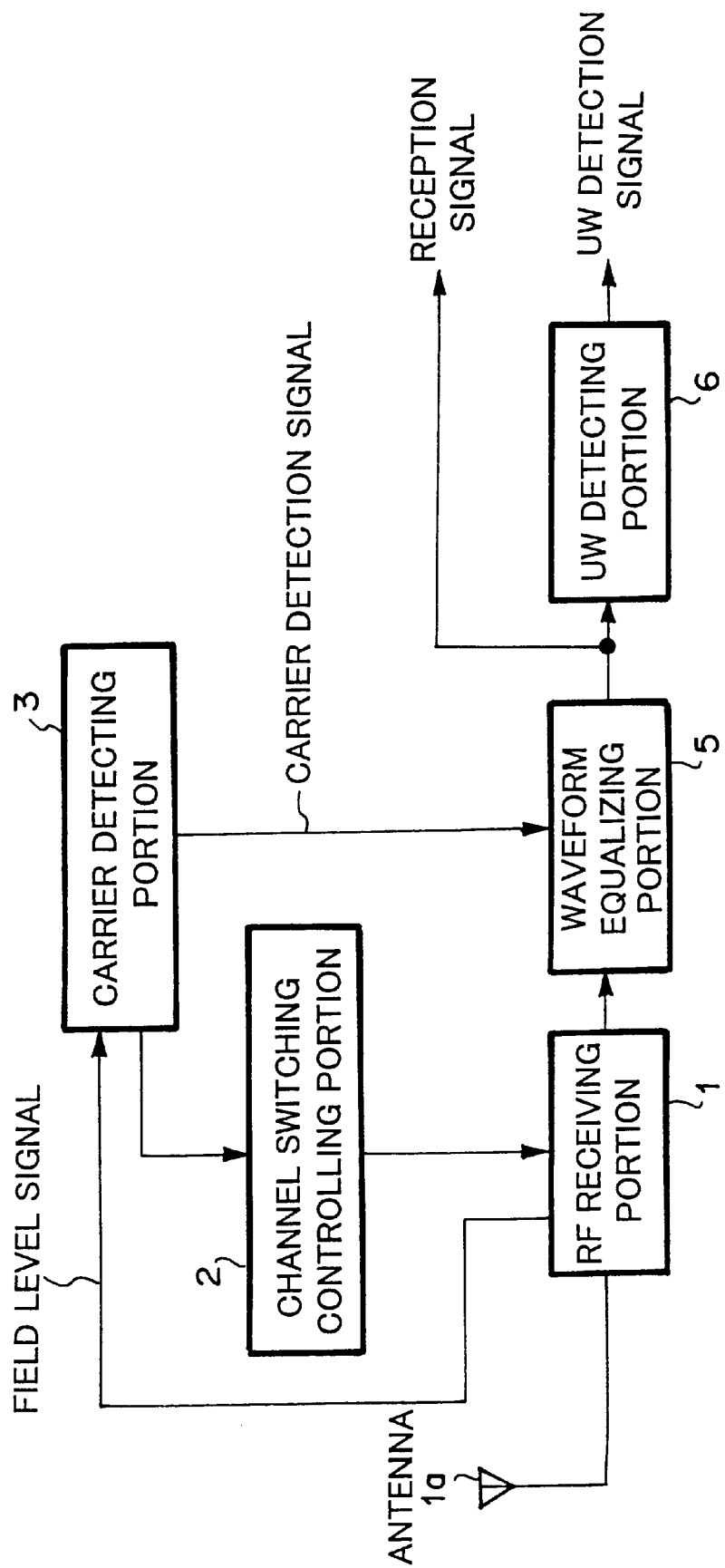
FIG. 1 is a block diagram showing the outlined structure of a conventional mobile wireless terminal.
Figure 2:
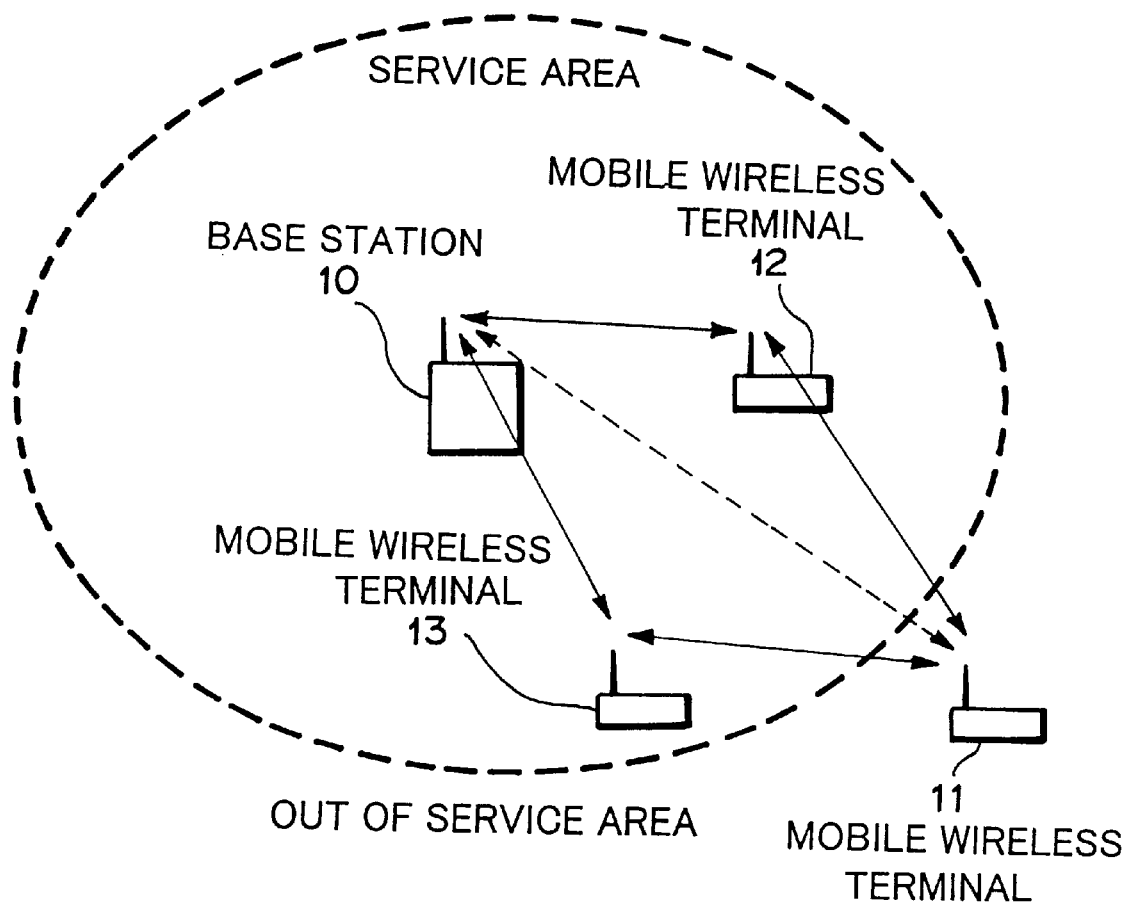
FIG. 2 is a schematic diagram showing a receiving operation of the mobile wireless terminal in out-of-service-area state.

FIG. 3A is a block diagram showing the structure of a mobile wireless terminal according to an embodiment of the present invention. The mobile wireless terminal shown in FIG. 3A has a sliding controlling portion 4 along with the principal portions of the mobile wireless terminal shown in FIG. 1. Next, only portions that are different from the structure shown in FIG. 1 will be described.

In this embodiment, when a carrier detecting portion 3 cannot detect a carrier for a predetermined time period, the carrier detecting portion 3 supplies a channel switch request signal to a channel switching controlling portion 2. However, when the carrier detecting portion 3 detects a carrier, the carrier detecting portion 3 supplies the carrier to a sliding controlling portion 4. A UW detecting portion 6 detects an UW from a preamble of a reception signal sequence whose waveform distortion has been equalized by a waveform equalizing portion 5. The detected result is supplied to the sliding controlling portion 4.

The sliding controlling portion 4 generates a synchronous search signal for a predetermined time period with a trigger of the carrier detection signal received from the carrier detecting portion 3. Corresponding to the synchronous search signal, the sliding controlling portion 4 intermittently controls the power of the waveform equalizing portion 5 at predetermined timings. When the UW detecting portion 6

(that will be described later) has not detected a UW until the synchronous search signal is complete, the sliding controlling portion 4 supplies a channel switch request signal to the channel switching controlling portion 2 so as to switch the current reception channel of the RF receiving portion 1 to another reception channel. When the UW detecting portion 6 has detected a UW, the sliding controlling portion 4 generates a synchronous signal that synchronizes with the period of the reception frame at the UW detection timings and controls (turns on/off) the power of the waveform equalizing portion 5 corresponding to the synchronous signal as shown in FIG. 3A.

The channel switching controlling portion 2 receives the channel switch request signal from the carrier detecting portion 3 or the sliding controlling portion 4 and switches the current reception channel (reception frequency) of the RF receiving portion 1 to another channel. The switching operation is performed by varying the frequency of a synthesizer of the RF receiving portion 1 (the synthesizer composes a converting unit that converts a frequency between a transmission/reception frequency and an intermediate frequency) as with the structure shown in FIG. 1.

In synchronous search mode, the waveform equalizing portion 5 performs the on/off operation of a circuit power switch at predetermined timings corresponding to the synchronous search signal received from the sliding controlling portion 4. In synchronous mode, the waveform equalizing portion performs the on/off operation of the circuit power switch corresponding to the synchronous signal (that synchronizes with the period of the reception frame) received from the sliding controlling portion 4. An output signal of the waveform equalizing portion 5 is supplied to a demodulator (not shown) and the UW detecting portion 6.

FIG. 3B is a block diagram showing the structure of the waveform equalizing portion (waveform equalizer) 5 shown in FIG. 3A. The waveform equalizing portion 5 is an n-tap feed forward type filter. Referring to FIG. 3B, a base band signal that is output from the RF receiving portion 1 is supplied to delaying circuits T 2031 to 2033 that are connected in series. Output signals of the delaying circuits T 2031 to 2033 are multiplied by tap weight coefficients W1 to Wn of multiplying devices 2034 to 2037, respectively. Output signals of the multiplying devices 2034 to 2037 are supplied to an adding device 2038. The adding device 2038 adds the output signals of the multiplying devices 2034 to 2037. An output signal of the adding device 2038 is supplied as the reception signal to the UW detecting portion 6. On the other hand, the synchronous search signal from the sliding controlling portion 4 causes a power switch 21 of a power line of a power circuit 20 to be turned on/off. In the synchronous search mode, the power switch 21 is turned off. In the synchronous mode, the power switch 21 is turned on. A power of the waveform equalizing portion is mainly consumed by the delaying circuits T 2031 to 2033, the multiplying devices 2034 to 2037, and the adding device 2038 in the synchronous mode.

Next, with reference to FIG. 4, the operation of the mobile wireless terminal will be described.

Now, it is assumed that the mobile wireless terminal does not synchronize with a frame of a base station (namely, the mobile wireless terminal is in out-of-service-area state). First of all, the RF receiving portion 1 receives a radio wave on a designated reception channel (at a designated reception frequency) from the base station. Next, the carrier detecting portion 3 determines whether or not the transmission radio wave has been received (at step S10). When the carrier detecting portion 3 has not received a carrier for a predetermined time period, the carrier detecting portion 3 supplies a channel switch request signal to the channel switching controlling portion 2. When the channel switching controlling portion 2 receives the channel switch request signal, the channel switching controlling portion 2 switches the current reception channel of the RF receiving portion 1 to another reception channel (at step S11). Steps S10 and S11 are repeated until the carrier detecting portion 3 detects a carrier.

When the carrier detecting portion 3 has detected a carrier at step S11, the carrier detecting portion 3 supplies a carrier detection signal to the sliding controlling portion 4. The sliding controlling portion 4 controls on/off operation of the power of the wavelength equalizing portion 5 at a period slightly shorter or longer than the frame period (at step S12). After the synchronous searching operation is started, the UW detecting portion 6 determines whether or not a UW is contained in a preamble of the reception signal sequence that is output from the RF receiving portion 1 (at step S13).

When the UW detecting portion 6 has not received a UW at step S13, the sliding controlling portion 4 turns off the power of the waveform equalizing portion 5, completes the synchronous searching operation (at step S14), and supplies the channel switch request signal to the channel switching controlling portion 2. When the channel switching controlling portion 2 receives the channel switch request signal, the channel switching controlling portion 2 switches the current reception channel of the RF receiving portion 1 to another reception channel (at step S11).

When the UW detecting portion 6 has detected a UW at step S13, the sliding controlling portion 4 extracts a reference timing from the reception frame (for example, TDMA frame) with a trigger of the UW detection timing of the UW detecting portion 6 and acquires the synchronization of the reception frame corresponding to the fame reference timing. When the frame synchronization is established with the acquisition of the synchronization of the reception frame, the power of the waveform equalizing portion 5 is on/off controlled in synchronization with the period of the reception frame. Thus, the UW detecting portion 6 predicts a detection timing of the next UW corresponding to the timing of the reception frame and detects the UW in the frame period (at step S15). Thus, data can be received in the frame period.

The carrier detecting operation of the carrier detecting portion 3 is practically performed in the following manner.

For example, as shown in FIG. 5, it is assumed that a reception signal (a) has been input to the RF receiving portion 1 in a period from time t1 to t2. In this case, signal level of the field level signal (b) that is output from the RF receiving portion 1 rises at time t1 as denoted by a solid line shown in FIG. 5. When the signal level of the field level signal (b) exceeds a threshold value (denoted by a dashed line shown in FIG. 5), the carrier detecting portion 3 determines that the transmission radio wave has been received and outputs a carrier detection signal (c) in high level as shown in FIG. 5.

Figure 6:
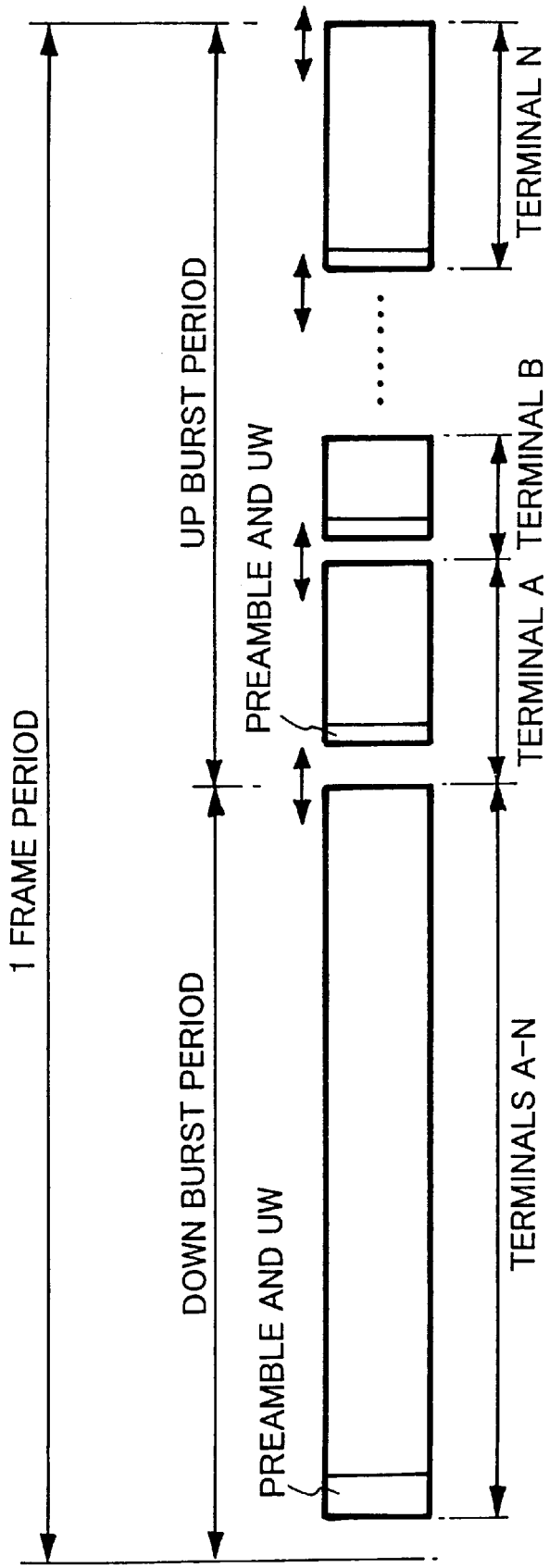
FIG. 6 is a schematic diagram showing an example of a TDMA/TDD frame format.

In the mobile wireless terminal according to the embodiment, TDMA/TDD method is used. In this method, with channels for a plurality of carriers allocated to a digital cordless telephone unit, transmission information and reception information are multiplexed and alternately exchanged. FIG. 6 shows an example of the frame format in the TDMA/TDD method.

In the frame format of the TDMA/TDD method, a down burst period of one frame represents a period in which the base station transmits a signal to each mobile wireless terminal. On the other hand, an up burst period represents a period in which each mobile wireless terminal transmits a signal to the base station. The length of each burst is variable. At the beginning of each of the up burst and the down burst, a preamble pattern and a UW pattern are placed. The preamble pattern is used to initially set such as tap coefficients of the waveform equalizing portion 5. The UW pattern is used to detect the beginning of data and perform a frame synchronization. The preamble pattern is for example a PN (Pseudo-Noise) code. An UW pattern of the up burst is different from an UW pattern of the down burst.

Next, the power controlling operation of the sliding controlling portion 4 for the wave equalizing portion 5 will be described. FIGS. 7A, 7B, 7C, and 7D are schematic diagrams for explaining the power controlling operation of the sliding controlling portion 4 for the waveform equalizing portion 5. FIG. 7A shows a TDMA/TDD frame that composes a reception signal sequence. FIG. 7B shows the synchronous searching operation in the case that a carrier is detected. FIG. 7C shows the power on/off operation of the waveform equalizing portion 5. FIG. 7D shows a detected UW. In FIG. 7A, D represents a down burst period, whereas U represents an up burst period.

When a carrier is detected, the sliding controlling portion 4 generates a synchronous search timing for a predetermined period as shown in FIG. 7B against a reception frame shown in FIG. 7A and intermittently turns on/off the power of the waveform equalizing portion 5 corresponding to the synchronous search timing as shown in FIG. 7C (in synchronous search mode). As shown in FIG. 7D, when a UW is detected in a period of which the power of the waveform equalizing portion is turned on, the sliding controlling portion 4 enters the synchronous mode. In the synchronous mode, a down reception burst is demodulated and data is received.

In the synchronous search mode, when an UW has not been detected until the next frame at the synchronous search timing, the sliding controlling portion 4 determines that a down burst has not been received, turns off the power of the waveform equalizing portion 5, and supplies the channel change request to the channel switching controlling portion 2.

In the synchronous search mode, when the reception frame period is 2 ms and the period of the synchronous signal (counter period of the sliding controlling portion) is 1.96 ms, the time period after the waveform equalizing portion is initially turned on at the position of the reception frame until it is turned on next at the same position is up to 50 frames. Thus, the waveform equalizing portion operates up to 50 times.

In the synchronous search mode, the waveform equalizing portion 5 is intermittently turned on/off at predetermined intervals for a predetermined time period. In this case, the time period for which the power of the waveform equalizing portion 5 is turned on is at least the period of the preamble. When the time period for which the power is turned on is prolonged, a UW may be quickly detected in the synchronous search mode. However, the power consumption of the waveform equalizing portion 5 may increase.

In the mobile wireless terminal according to the embodiment, a UW pattern of a up burst is different from a UW pattern of a down burst. A UW is detected in the down burst period. Thus, it can be securely determined whether or not a down burst is present on a reception channel of which a carrier is detected. Consequently, the waveform equalizing portion 5 can be prevented from improperly operating with a transmission burst received from another mobile wireless terminal.

As described above, according to the present invention, it can be securely determined whether or not a transmission signal has been received from a base station. Even if a carrier is detected due to a signal received from other than the base station, the waveform equalizing portion is prevented from improperly operating. In other words, the current reception channel is switched to another reception channel. Consequently, the power consumption can be effectively suppressed in standby state and in out-of-service-area state.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile wireless terminal, comprising:

RF receiving means for receiving a transmission radio wave received from a base station on a designated channel;

a waveform equalizer for equalizing waveform distortion of a signal received by said RF receiving means;

a unique word detector for detecting a unique word from a reception signal sequence whose waveform distortion has been equalized by said waveform equalizer;

channel switching controlling means for switching the current reception channel of said RF receiving means to another reception channel corresponding to a channel switch request;

carrier detector for detecting whether or not a transmission radio wave has been received by said RF receiving means and supplying a channel switch request to said channel switching controlling means when the transmission radio wave has not been received for a predetermined time period; and sliding controlling means for performing an on/off control for the power of said waveform equalizer at predetermined intervals for a predetermined time period when a transmission radio wave has been detected by said carrier detector, for turning off the power of said waveform equalizer and supplying a channel switch request to said channel switching controlling means if a unique word has not been detected by said unique word detector when the on/off control had been performed, and for performing the on/off control for the power of said waveform equalizer in synchronization with a frame period of the reception signal sequence corresponding to a detection timing of the unique word when the unique word has been detected.

2. The mobile wireless terminal as set forth in claim 1, wherein said sliding controlling means performs the on/off control for the power of said waveform equalizer in a period different from the frame period that composes the reception signal sequence.

3. The mobile wireless terminal as set forth in claim 2, wherein said sliding controlling means performs the on/off control for the power of said waveform equalizer at least T2/|T2−T1| times, where T1 is the frame period and T2 is a period for which said sliding controlling means performs the on/off control for the power of said waveform equalizer.

4. The mobile wireless terminal as set forth in claim 3,
wherein the reception signal sequence is composed of a down burst period and an up burst period,
wherein a unique word pattern in the down burst period is different from a unique word pattern in the up burst period, and
wherein said unique word detector detects a unique word in the down burst period.

5. The mobile wireless terminal as set forth in claim 2,
wherein the reception signal sequence is composed of a down burst period and an up burst period,
wherein a unique word pattern in the down burst period is different from a unique word pattern in the up burst period, and
wherein said unique word detector detects a unique word in the down burst period.

6. The mobile wireless terminal as set forth in claim 1,
wherein the reception signal sequence is composed of a down burst period and an up burst period,
wherein a unique word pattern in the down burst period is different from a unique word pattern in the up burst period, and
wherein said unique word detector detects a unique word in the down burst period.

7. A power controlling method for use with a mobile wireless terminal having a waveform equalizer for equalizing waveform distortion of a reception signal, comprising the steps of:
   (a) determining whether or not a transmission radio wave has been received for a predetermined time period;
   (b) when the transmission radio wave has not been received, switching the current reception channel to another reception channel and receiving the transmission radio wave;
   (c) when the transmission radio wave has been received, performing on/off control for the power of the waveform equalizer at predetermined intervals for a predetermined time period;
   (d) when the on/off control for the power of the waveform equalizer had been performed, if a unique word has not been detected from a reception signal sequence that is output from the waveform equalizer, turning off the power of the waveform equalizer, switching the current reception channel to another reception channel, and receiving the transmission radio wave;
   (e) when a unique word has been detected, performing the on/off control for the power of the waveform equalizer in synchronization with a frame period of the reception signal sequence at a unique word detection timing.

8. The power controlling method as set forth in claim 7,
wherein the on/off control for the power of the waveform equalizer is performed in a period different from the frame period that composes the reception signal sequence.

9. The power controlling method as set forth in claim 8,
wherein the on/off control for the power of the waveform equalizer is performed at least $T2/|T2-T1|$ times, where $T1$ is the frame period and $T2$ is a period for which the on/off control for the power of said waveform equalizer is performed.

10. The power controlling method as set forth in claim 9,
wherein the reception signal sequence is composed of a down burst period and an up burst period,
wherein a unique word pattern in the down burst period is different from a unique word pattern in the up burst period, and
wherein the unique word is detected from the down burst period.

11. The power controlling method as set forth in claim 8,
wherein the reception signal sequence is composed of a down burst period and an up burst period,
wherein a unique word pattern in the down burst period is different from a unique word pattern in the up burst period, and
wherein the unique word is detected from the down burst period.

12. The power controlling method as set forth in claim 7,
wherein the reception signal sequence is composed of a down burst period and an up burst period,
wherein a unique word pattern in the down burst period is different from a unique word pattern in the up burst period, and
wherein the unique word is detected from the down burst period.

* * * * *